United States Patent [19]

Tietjen et al.

[11] Patent Number: 5,689,659

[45] Date of Patent: Nov. 18, 1997

[54] METHOD AND APPARATUS FOR BURSTING OPERAND TRANSFERS DURING DYNAMIC BUS SIZING

[75] Inventors: Donald L. Tietjen; Frank C. Galloway; Juan Guillermo Revilla; Nancy G. Woodbridge; David M. Menard; Ronny L. Arnold, all of Austin, Tex.

[73] Assignee: Motorola, Inc., Schaumburg, Ill.

[21] Appl. No.: 550,043

[22] Filed: Oct. 30, 1995

[51] Int. Cl.[6] ............................. G06F 13/28; G06F 13/00
[52] U.S. Cl. ............................................... 395/307; 395/855
[58] Field of Search ................................. 395/306–309, 395/280, 842, 800, 821, 775, 855; 370/85.13

[56] References Cited

U.S. PATENT DOCUMENTS

| | | | |
|---|---|---|---|
| 4,633,437 | 12/1986 | Mothersole et al. | 364/900 |
| 4,751,632 | 6/1988 | Mothersole et al. | 364/200 |
| 4,799,199 | 1/1989 | Scales et al. | 365/238 |
| 5,073,969 | 12/1991 | Shoemaker | 395/307 |
| 5,341,481 | 8/1994 | Tsukamoto | 395/287 |
| 5,394,528 | 2/1995 | Kobayashi et al. | 395/307 |
| 5,423,009 | 6/1995 | Zhu | 395/307 |
| 5,537,659 | 7/1996 | Nakao | 395/307 |
| 5,548,786 | 8/1996 | Amini et al. | 395/842 |
| 5,550,989 | 8/1996 | Santos | 395/306 |
| 5,553,244 | 9/1996 | Norcross et al. | 395/280 |

*Primary Examiner*—Gopal C. Ray

[57] ABSTRACT

A data processing system (10) having a bus controller (5) that uses a communication bus (22) which adapts to various system resources (7) and is capable of burst transfers. In one embodiment, the processor core (2) and system resources (7) supply control signals supplying required parameters of the next transfer. The bus controller is capable of transferring operands and/or instructions in incremental bursts from these system resources. Each transfer data burst has an associated unique access address where successive bytes of data are associated with sequential addresses and the burst increment equals the data port size. The burst capability is dependent on the ability of system resource (7) to burst data and can be inhibited with a transfer burst inhibit signal. The length of the desired data is controlled by a sizing signal from the core (2) or from cache and the increment size is supplied by the resource (7).

19 Claims, 6 Drawing Sheets

A/D —ADDRESS AND DATA
DA* —DATA ACKNOWLEDGE
ESIZ —(EXTERNAL) REQUEST DATA LENGTH VALUE
ISIZ —(INTERNAL) REQUESTED DATA LENGTH VALUE
TBI* —TRANSFER BURST INHIBIT
TS* —TRANSFER START
OTH —OTHER CONTROLS

A/D — ADDRESS AND DATA
DA* — DATA ACKNOWLEDGE
ESIZ — (EXTERNAL) REQUEST DATA LENGTH VALUE
ISIZ — (INTERNAL) REQUESTED DATA LENGTH VALUE
TBI* — TRANSFER BURST INHIBIT
TS* — TRANSFER START
OTH — OTHER CONTROLS

| DYNAMIC BURST CLOCKS |||||
|---|---|---|---|---|---|
| OPERAND SIZE | PORT SIZE | BURST CLOCKS || NON-BURST CLOCKS ||
| | | READ | WRITE | READ | WRITE |
| BYTE | BYTE | 2 | 2 | 2 | 2 |
| BYTE | WORD | 2 | 2 | 2 | 2 |
| BYTE | LONGWORD | 2 | 2 | 2 | 2 |
| WORD | BYTE | 3 | 3 | 5 | 4 |
| WORD | WORD | 2 | 2 | 2 | 2 |
| WORD | LONGWORD | 2 | 2 | 2 | 2 |
| LONGWORD | BYTE | 5 | 5 | 11 | 8 |
| LONGWORD | WORD | 3 | 3 | 5 | 4 |
| LONGWORD | LONGWORD | 2 | 2 | 2 | 2 |
| LINE | BYTE | 17 | 17 | 47 | 32 |
| LINE | WORD | 9 | 9 | 23 | 16 |
| LINE | LONGWORD | 5 | 5 | 11 | 8 |

*FIG. 6*

METHOD AND APPARATUS FOR BURSTING OPERAND TRANSFERS DURING DYNAMIC BUS SIZING

REFERENCE TO RELATED APPLICATIONS

The present application is related to the following U.S. patent application:

"Method and Apparatus for address Extension Across A Multiplexed Communication Bus", invented by Donald L. Tietjen et al., having Ser. No. 08/550,311, filed concurrently herewith on Oct. 30, 1995, and assigned to the assignee hereof.

FIELD OF THE INVENTION

The present invention relates in general to a data processing system, and more particularly to a method of bursting operand transfers during dynamic bus sizing.

BACKGROUND OF THE INVENTION

The performance of a microprocessor in data processing applications is affected by its ability to communicate with many system resources. These resources, both external peripherals and internal modules, are not necessarily of uniform data width (i.e. port size.) Many times the size of an external device is a sub-multiple of the bit capability of a microprocessor. This is particularly true when considering 32 bit microprocessors as they may be used to communicate byte (8 bits), word (16 bits), longword (32 bits) or line (128 bits) information to memory that is byte, word, or longword width, all of which are port sizes that are equal to or are sub-multiples of a 32 bit microprocessor. To accommodate the potential vagaries of a system, a bus controller, either internally or externally, manages the interface between a processor core and the various resources of a system. Such a bus controller receives control signals from a processor core as well as other system resources, and based on these signals determines the parameters of data required and the configuration of resource ports, and performs requested data transfers.

In most system resources which are memories, each unit of data is associated with a unique address. That is, each unique address has associated with it a byte of data. A data transfer involves processor core supplying an address followed by a read or write of the associated data. In some situations the length of data required exceeds the width of the data port, for example, the situation in which a core requests a word of data while a memory device is only capable of byte width sized data transfers. In this case, only the first address or access address is necessary, as the next data is located at subsequent addresses. Some memory devices are capable of supplying subsequent data without being supplied each incremental address. The data is sent in a "burst" starting with the data of the access address and requires no further address information for that particular burst.

Typically, the burst data is information to be stored in cache memory for later access. The length of data to be stored in a cache memory is typically fixed at one line. In most cache applications, the length of the total burst and the size of the burst increment are each a fixed length, typically line and longword respectively. The burst then is used to efficiently transfer one line of data in four longword size bursts. This proves to be an efficient use of communication bus or busses and reduces the total cycle count necessary for specific types of data transfers having a fixed burst increment size and a fixed length of data (e.g. one line.) However, this does not fully exploit the concept of burst transfers and does not offer a flexible solution considering the vagaries of system resources.

BRIEF DESCRIPTION OF THE DRAWINGS

FIG. 6 illustrates, in tabular form, cycle reduction effected by various system configurations in accordance with one embodiment of the present invention.

DESCRIPTION OF PREFERRED EMBODIMENT

The present invention allows more flexible communication in a data processing system, while significantly increasing the efficiency of these communications. This is done with a data processing system having a bus controller that uses a communication bus capable of adapting to various system resource port sizes. In one embodiment this communication bus is considered to include Address and Data (A/D) bus 26. This dynamic sizing of the communication bus is coupled with the capability of burst transfers. The processing system of one embodiment has a processor core which is made up of a central processing unit (CPU) and a memory bank. Alternate embodiments may include CPU, cache memory module, memory management controller unit, direct memory access unit, multiple CPUs, as well as other modules. In one embodiment, control signals provide required parameters of each transfer from which the bus controller transfers operands and/or instructions in incremental bursts to and from the processor core and various system resources. The bursts represent successive bytes of data associated with sequential addresses where the burst increment equals the size of the data port. In some literature this burst increment is referred to as a beat. In one embodiment, burst capability is dependent on the system resource's ability to burst data and can be inhibited with a transfer burst inhibit signal from the system resource. In one embodiment, control signals include, but are not limited to, (1) length of the requested data as a sizing signal from the core, and (2) increment size or data port size from the system resource.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. For clarity, the case of a signal which has a logic level zero true state will be so signified by an asterisk following the name of the signal (e.g. ITS* is the Internal Transfer Start signal which has an active low level.)

Brackets will be used to indicate the conductors of a bus or the bit locations of a value. For example, "bus 20 [0–7]" or "conductors [0–7] of bus 20" indicates the eight lower order conductors of bus 20, and "address bits [0–7]" or "ADDRESS [0–7]" indicates the eight lower order bits of an address value.

Figure 1:
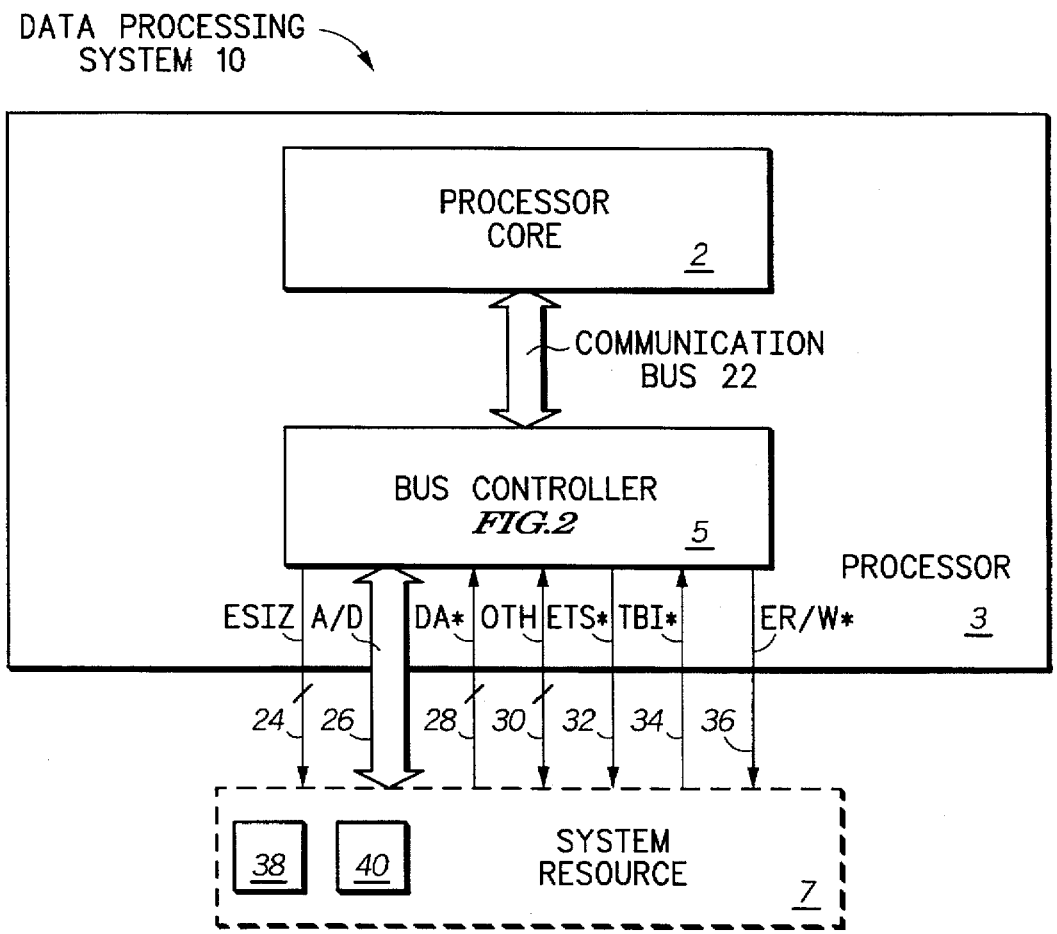
FIG. 1 illustrates, in block diagram form, a data processing system 3 in accordance with one embodiment of the present invention.

FIG. 1 illustrates a data processing system 10 having a data processor 3 and a system resource 7. Data processor 3 is coupled to system resource 7 by way of A/D bus 26 and by way of control signal conductors 24, 28, 30, 32, 34, and 36. Although the embodiments of the present invention illustrated in FIGS. 1–5 illustrate bus 26 as being a 32-bit bus, alternate embodiments of the present invention may use any number of conductors in each bus.

Data processor 3 includes a processor core circuitry 2 which is bi-directionally coupled to bus controller 5 by way of communication bus 22. In alternate embodiments of the present invention, various portions of data processing system 10 may be implemented on the same or on different integrated circuits. In one embodiment of the present invention, all of data processing system 10 may be implemented on one integrated circuit.

Still referring to FIG. 1, in this embodiment, system resource 7 is made up of many individual peripheral units represented by units 38 and 40, each with a data port which is coupled to bus controller 5 by way of A/D bus 26, and control signal conductors ESIZ 24, DA* 28, OTH 30, ETS* 32, TBI* 34, and ER/W* 36. In alternate embodiments the peripheral units within the system resource 7 may be as few as one single peripheral unit or may be a plurality of units. In one embodiment, system resource 7 is formed on a separate integrated circuit. In alternate embodiments, system resource 7 and processor 3 may be built on the same integrated circuit.

Figure 2:
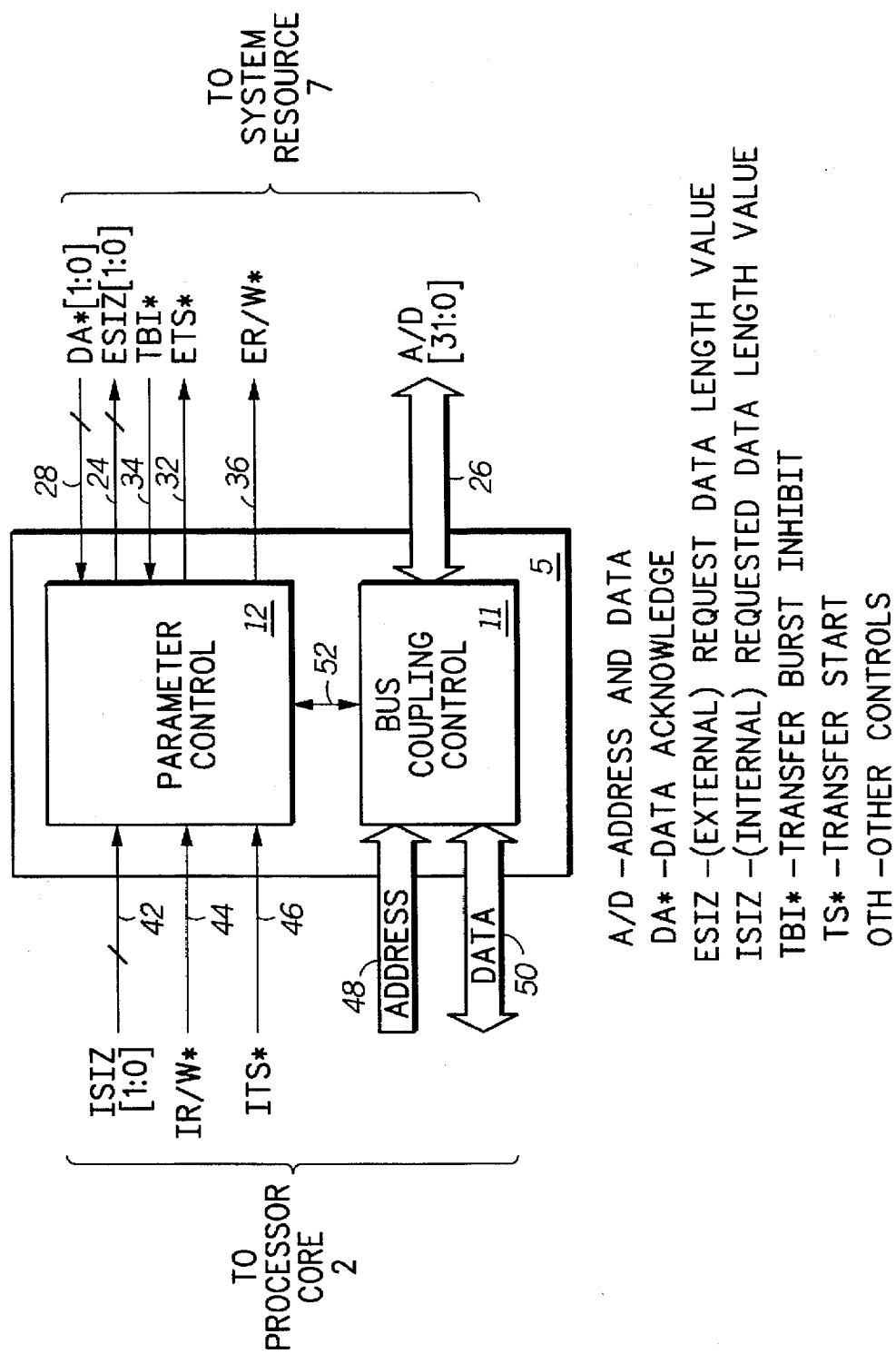
FIG. 2 illustrates, in block diagram form, a bus interface 5 in accordance with one embodiment of the present invention.

Referring now to FIG. 2, FIG. 2 details bus controller 5 as consisting of parameter control circuit 12 which is bi-directionally coupled to bus coupling control circuit 11 via bus 52. The parameter control circuit 12 is coupled to core 2 by way of conductors IR/W* 44, ITS* 46, and ISIZ 42, and is coupled to system resource 7 by way of conductors DA* 28, ESIZ 24, TBI* 34, ETS* 32, and ER/W* 36. The bus coupling control unit 11 is coupled to core 2 by Address bus 48 and Data bus 50, and to system resource 7 by way of bus A/D 26.

Referring to FIG. 1, the present invention uses a bus controller 5 to interface between a core 2 and a system resource 7. Bus controller 5 and system resources 7 may be formed on the same integrated circuit or in alternate embodiments may be formed on different integrated circuits. In one embodiment of the present invention, bus controller 5 is internal to an integrated circuit processor 3 and system resource 7 is external to the integrated circuit. Bus controller 5 is capable of transferring data between the core 2 and system resource 7 based on parameter information supplied to bus controller 5 from core 2 regarding requested data length and from system resource 7 regarding port size. Note that in one embodiment core 2 provides the requested data length information to bus controller 5 by way of one or more conductors in communication bus 22. In one embodiment port size is a sub-multiple of the bit capability of core 2. Bus controller 5 sizes A/D bus 26 to the necessary bit width and is capable of re-sizing A/D bus 26 following any complete data transfer. Note that in one embodiment of the present invention, the bus size is not changed within a burst transfer. Further, bus controller 5 is able to transfer this data in dynamically sized bursts (i.e. burst increment may change from one transfer to the next) from system resource 7. In one embodiment, bus controller 5 defaults to burst transfers until system resource 7 signals a transfer burst inhibit signal. Alternate embodiments of the present invention could instead use a burst enable signal to maintain burst transfer mode.

In FIG. 2, one embodiment of bus controller 5 is shown which interfaces between core 2 and external system resource 7 using time multiplexed address and data busses 26. Alternate embodiments of the present invention may use any combination of multiplexed and non-multiplexed busses. In this embodiment of the present invention, core 2 indicates data transfer start with Internal Transfer Start (ITS*) signal 46 as well as indicating the direction of the next transfer with the Internal Read/Write (IR/W*) signal 44 input to bus controller 5. In this embodiment ITS* 46 is a signal with a logical true state of zero and IR/W* 44 is a signal wherein logical one signifies a data read and logical zero signifies a data write. Note that in one embodiment of the present invention, bus controller 5 is capable of data bursts for read transfers (i.e. data from system resource to core) and write transfers (i.e. data from core to system resource) transfers. In one embodiment core 2 supplies a requested data length value called Internal Size (ISIZ) signal 42 to indicate the length of the requested data. The core supplies the requested data length value to bus controller 5 by way of one or more conductors in communication bus 22. Parameter control circuit 12 of bus controller 5 processes this information and sends the value on External Size conductor ESIZ signal 24 to system resource 7. Note that in this embodiment the value ESIZ 24 is equal to the value of ISIZ 42 and each signal is two bits in length. Alternate embodiments of the present invention may use only one or may use any number of ISIZ 42 and ESIZ 24 depending upon the number of available port sizes and data lengths. Note also that in other embodiments of the present invention, the requested data length value may alternatively be encoded on other signals instead of separately provided on the size signal conductors ISIZ 42 and ESIZ 24. Additionally, parameter control 12 processes IR/W* 44 and ITS* 46 and then transmits this information as External Read/Write (ER/W*) signal 36 and External Transfer Start (ETS*) signal 32 respectively to system resource 7. In one embodiment, other transfer and operation information is transferred on one or on a plurality of conductors by way of an Other Signals (OTH) signal 30. Bus controller 5 then determines the total number of increments necessary to fulfill the request, based on data port size. This requested data could be an operand for storage in cache, or an instruction that a CPU in core 2 will use immediately. The ability to use data directly or store it for later use increases flexibility in data processing as well as reducing the time required for core 2 to access data and perform operations. In one embodiment of the present invention bus controller 5 defaults to burst transfers unless system resource 7 asserts Transfer Burst Inhibit (TBI*) signal 34. Bus coupling control 11 provides address information to system resource 7 and transfers data information between core 2 and system resource 7. Note that alternate embodiments of the present invention could instead use the assertion of a burst enable signal asserted to indicate burst transfers. For a data read, system resource 7 supplies bus controller 5 with the initial data starting at the access address along with a Data Acknowledge (DA*) signal 28 that acknowledges valid data transfer and indicates the size of its data port. For a data write, system resource 7 receives the data information from bus controller 5 and indicates the size of its data port. In one embodiment of the present invention DA* 28 is two bits in length, but alternate embodiments may use only one or may use any number of bits depending on the port sizes available. Note that in other embodiments of the present invention port size information may alternatively be encoded on other signals or may be provided separately. For purposes of this example, it is assumed that processor 3 is compatible with system resource 7 of byte (8 bits), word (16 bits), or longword (32 bits) sized ports. However, alternate embodiments of the present invention may use any combination of port sizes.

Figure 3:
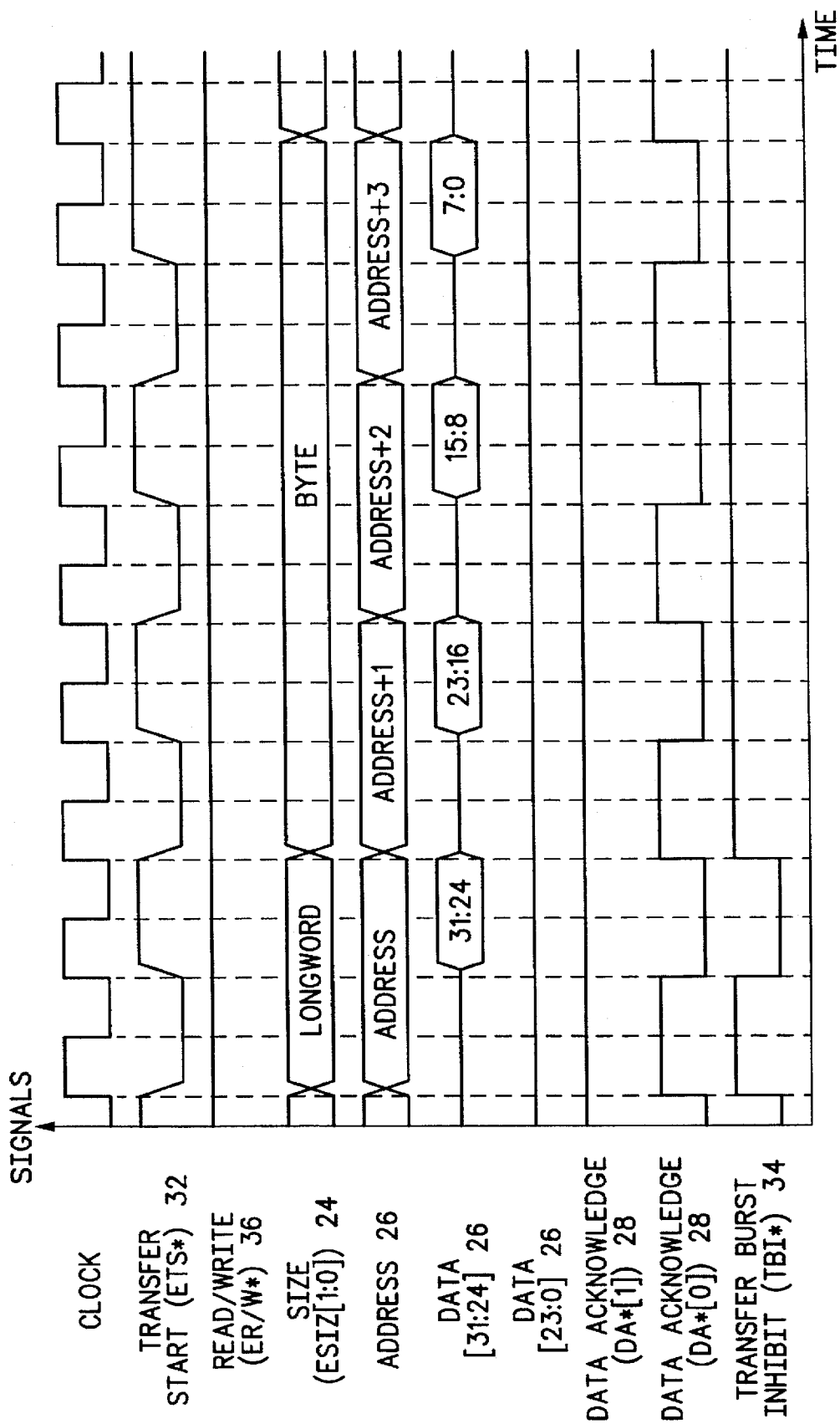
FIG. 3 illustrates, in timing diagram form, the timing of various signals in accordance with one embodiment of the present invention which has separate data and address busses and a resource without burst capability.

Further to illustrate the advantage of burst transfers in comparison with non-burst transfers, consider one embodiment which has processor 3 and system resource 7 coupled to separate address and data busses. The timing diagram in FIG. 3 represents one embodiment where bus A/D 26 is separated into an address bus and a data bus and is not multiplexed. The diagram details the timing of a long word transfer from a byte sized port without burst transfer. The transfer begins when the core 2 supplies ISIZ 42 information indicating the requested data length. Core 2 also provides the access address and asserts ITS* 46. In this example, core 2 requests a long word of data The bus controller 5 transmits this requested data length value to system resource 7, by control signal ESIZ 24. One clock cycle later, system resource 7 supplies data acknowledge (DA*) signal 28 via conductors 28 indicating the port size of system resource 7. Note that alternate embodiments of the present invention may use only one or may use any number of DA* signals 28. Additionally, data port size values may be encoded with other signals provided separately, instead of on the DA* 28. In this example, the system resource 7 indicates that it is a byte sized port. In addition, the system resource 7 asserts TBI* 34 disallowing any burst access, and supplies the first byte of data. This first transfer of one byte of data requires two clock cycles. The second, third and fourth data transfers are identical and each requires two clock cycles. To transfer an entire long word requires system resource 7 to send four bytes of data, as seen in FIG. 3, each requiring two clock cycles. The total longword transfer therefore requires eight clock cycles.

Figure 4:
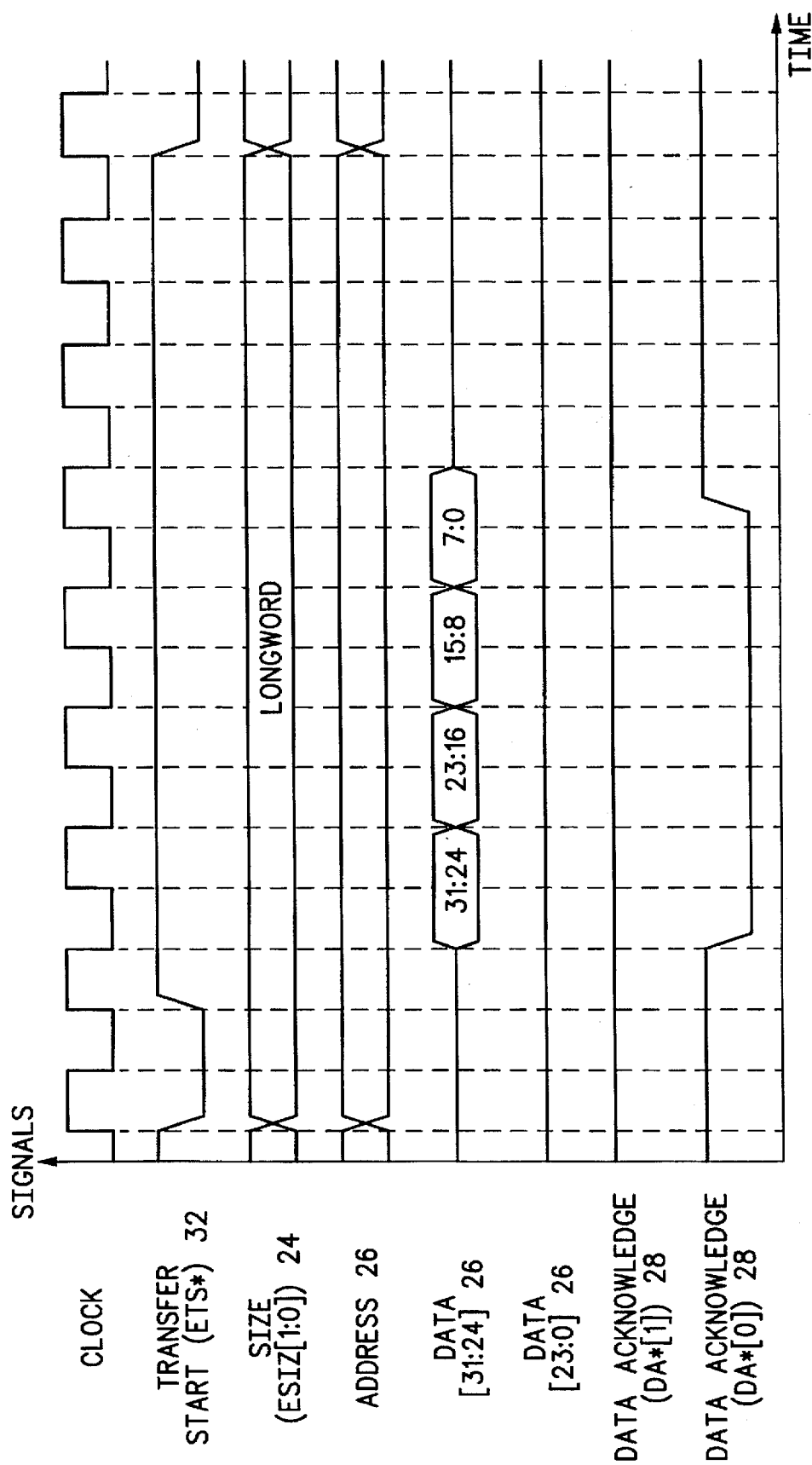
FIG. 4 illustrates, in timing diagram form, the timing of various signals in accordance with one embodiment of the present invention which has separate data and address busses and a resource with burst capability.

Continuing, another embodiment has the same processor 3 with the same configuration of separate address and data busses, and system resource 7 still a byte sized port, but now capable of burst transfers. FIG. 4 illustrates the timing diagram of this embodiment. As seen in FIG. 4, core 2 initiates the transfer by supplying requested data length as ISIZ 42, access address by Address bus 48, and transfer start indicator by ITS*. Likewise, system resource 7 supplies the port size indicator and begins sending data. There is no need for assertion of TBI* 34 in this case, as system resource 7 is capable of burst transfers. The first byte of data requires two clock cycles to transfer, just as in the example without burst capability. The second data transfer in this example is adjacent to the first. In one embodiment, during this transfer the address supplied on A/D 26 is not incremented, but is held for the entire long word transfer, however in alternate embodiments the address is incremented during this transfer. This means that the first byte of data requires two clock cycles but each successive byte making up the total burst requires one clock cycle each. In this example, the total write transfer will take five clock cycles. This reduces the total write transfer cycle count from eight clock cycles to five clock cycles. Such a reduction is accomplished by only supplying the initial address during burst mode rather than all incremental addresses as when transferring data without bursting. Note that in the bursting example, all of the same control signals are supplied to bus controller 5.

Figure 5:
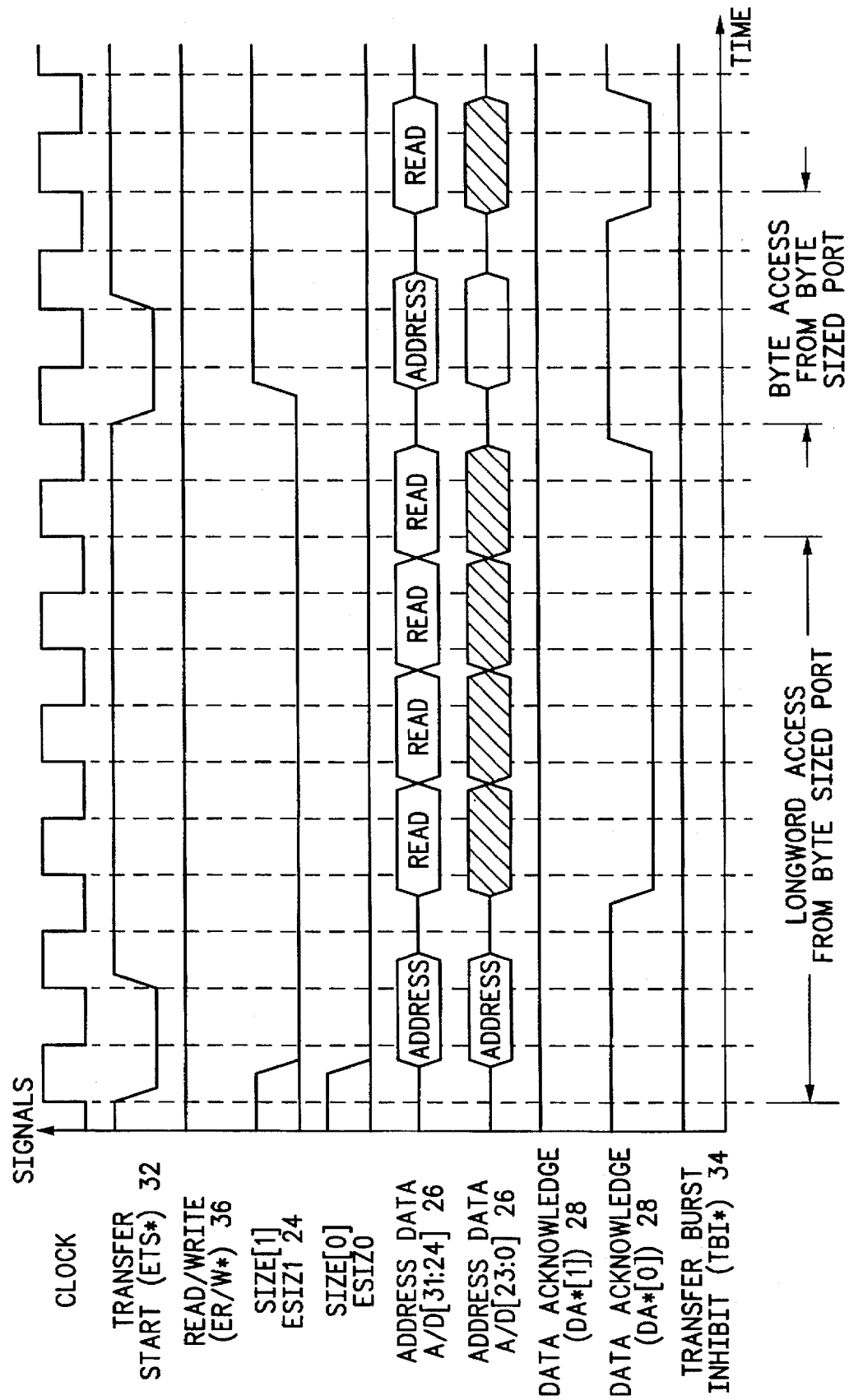
FIG. 5 illustrates, in timing diagram form, the timing of various signals in accordance with one embodiment of the present invention which has time multiplexed data and address busses and a resource with burst capability.

To complete the illustration of the burst transfer advantage in one embodiment, FIG. 5 is the timing diagram of sequential data transfers from a burst capable system resource 7 comprising several units each having different port sizes. In this embodiment, one unit is a burst capable byte sized port resource. Core 2 initiates each transfer by signaling a transfer start, indicating a read of data, supplying requested data length value, and sending an access address on the multiplexed bus. Bus controller 5 relays control signals between core 2 and system resource 7. System resource 7 responds by identifying itself as a byte sized port and supplies the first byte of data. Note that bus controller 5 is prepared for default burst transfer and system resource 7 does not request burst inhibit. The next three bytes of data are transferred in a burst to fulfill the core 2 requirement of a longword access. In this embodiment data is transferred on bits [31:24] of the multiplexed bus and this transfer requires five clock cycles. After completion of the transfer, DA* 28 indicates that system resource 7 is waiting for a next request. During a burst transfer, requested data length value and increment size (i.e. port size) are constant; however, upon completion of a burst transfer both are subject to change. In this embodiment of the present invention, the multiplexed bus requires one idle clock cycle between transfers to avoid bus contention, however some alternate embodiments do not have this requirement. In this example, the next core 2 request is to access one byte of data. Core 2 initiates the next request by indicating transfer start, signaling a data read, sending requested data length value, and supplying a next access address. As the total number of burst increments or beats is one, it is not necessary for system resource 7 to indicate burst inhibit. This transfer completes in two clock cycles and, as seen in FIG. 6, a byte access on any sized port may offer no cycle savings as it does not incorporate the burst feature. However, there is a substantial saving realized whenever the port size of system resource 7 is less than the requested data length.

As a comparison of the possibilities for one embodiment, FIG. 6 shows in tabular form, a comparison of cycles required for burst transfers versus non-burst transfers. The chart refers to one embodiment of the present invention having a 32 bit microprocessor and considers several possible transfers. The left most column, labeled "Operand Size" indicates core 2 requested data length. The next column labeled "Port Size" refers to port size of system resource 7. The chart then lists the number of cycles required, for each of these possible combinations, to transfer data using burst transfers and non-burst transfers under the respective headings. Additionally broken down within each type of transfer (i.e. burst or non-burst) are the number of cycles for a read transfer and for a write transfer. Notice that for several combinations read transfers require more cycles than write transfers due to the addition of extra cycles to avoid bus contention on the multiplexed bus. The first example across the top row considers a core 2 requested data length of one byte from a system resource 7 with a byte sized port. There is no cycle count difference for burst or non-burst in this case. For a burst transfer, the system resource 7 would send one increment burst of one byte. This is in effect the same transfer as a non-burst transfer and therefore the cycle count is the same. Referring to the fourth row, where core 2 requests one word of data and the port size is one byte, there is an initial saving of two cycles using burst transfer rather than non-burst transfer for read transfers. Extending this further to row seven, where the core 2 requests one longword of data again from the byte sized port of system resource 7, there is a reduction of six cycles from the non-burst to the burst transfer during read transfers. This is illustrated in FIG. 5. FIG. 3 shows the nonburst transfer of one longword from a byte sized port.

The method of burst transfer coupled with the dynamic bus sizing of this present invention is an efficient method of transferring data. Referring to FIG. 6, using the burst method of transfer reduces the cycles required to transfer one word of data from a byte sized port from five cycles to three. Note that in this embodiment, when the system resource 7 supplies the data (i.e. read of data) there is one additional cycle added for the time multiplexed to alleviate bus contentions. This cycle is not necessary when sending data to the system resource 7 (i.e. write of data) and accounts for any difference seen between these two columns in FIG. 6.

We claim:

1. A method for performing a plurality of burst accesses across a communication bus in a data processing system, the method comprising the steps of:

initiating a first one of the plurality of burst accesses;

providing a first requested data length to a bus controller;

providing a first resource port size to the bus controller;

in response to receipt of the first requested data length and the first resource port size, determining a first bus size and determining a first number of bursts;

dynamically sizing the communication bus to the first bus size;

providing the first requested data length external to a first resource port;

transferring the first number of bursts across the communication bus;

initiating a second one of the plurality of burst accesses;

providing a second requested data length to the bus controller;

providing a second resource port size to the bus controller;

in response to receipt of the second requested data length and the second resource port size, determining a second bus size and determining a second number of bursts;

dynamically sizing the communication bus to the second bus size;

providing the second requested data length external to a second resource port; and transferring the second number of bursts across the communication bus;

wherein the first bus size and the second bus size are different sizes for a first combination of requested data length and port size values; and wherein the first bus size and the second bus size are a same size for a second combination of requested data length and port size values.

2. A method as in claim 1, wherein the first one and the second one of the plurality of burst accesses are adjacent.

3. A method as in claim 1, wherein the first and second requested data lengths are a same requested data length.

4. A method as in claim 1, wherein the first and second resource ports are a same resource port.

5. A method as in claim 1, further comprising the step of:
   providing a transfer burst inhibit signal to the bus controller.

6. A method as in claim 5, further comprising the step of:
   initiating a new bus cycle and incrementing the address value if the transfer burst inhibit signal is asserted.

7. A method as in claim 1, wherein said step of providing a first requested data length comprises the step of:
   providing a data length signal.

8. A method as in claim 7, wherein the data length signal is provided by a processing unit.

9. A method as in claim 1, wherein a data acknowledge signal is provided to the bus controller.

10. A method as in claim 9, wherein the step of providing the data acknowledge signal comprises the step of:
    providing a wait state indicator signal while data transfer is not complete.

11. A data processing system, comprising:

a communication bus;

a processing unit; and bus controller means for controlling said communication bus, said bus controller means being coupled between said communication bus and said processing unit, said bus controller means comprising:

a first input;

a second input; and an output;

wherein in response to receiving a first requested data length value at the first input and a resource port size value at the second input, said bus controller means determines a bus size and a number of bursts to perform a burst access;

wherein in response to determining the bus size and the number of bursts, said bus controller means dynamically sizes said communication bus and performs the burst access; and wherein the first requested data length value is received from within the data processing system and the resource port size value is received from external to the bus controller means.

12. A data processing system as in claim 11, wherein said bus controller means dynamically sizes said communication bus to perform non-burst accesses in response to the requested data length value, the resource port size value, and a transfer burst inhibit signal.

13. A data processing system as in claim 11, wherein said communication bus is bi-directional time multiplexed address and data.

14. A data processing system as in claim 13, wherein said communication bus has a fixed address length and data length.

15. A data processing system as in claim 13, wherein said bus controller means further comprises:

a parameter control circuit; and a bus coupling control circuit.

16. A data processing system as in claim 11, wherein said bus controller means further comprises:

a parameter control circuit; and a bus coupling control circuit.

17. A data processing system as in claim 11, further comprising:

a system resource, coupled to said communication bus, said system resource providing the resource port size value to said bus controller means.

18. A data processing system as in claim 17, wherein said system resource, said processing unit, and said bus controller means are resident on a same integrated circuit.

19. A data processing system having burst access capability, comprising:
- a communication bus;
- a resource circuit, coupled to said communication bus;
- a processing unit; and
- a bus controller circuit, coupled between said communication bus and said processing unit, said bus controller circuit receiving a requested data length from said processing unit and receiving a resource port size from said resource circuit, said bus controller circuit providing the requested data length to said resource circuit, said bus controller circuit dynamically sizing said communication bus and determining a number of bursts in order to perform burst accesses in response to the requested data length and the resource port size.

* * * * *